June 2, 1970  TADASHIGE SATO ET AL  3,515,054
ROTARY TOASTER

Filed June 17, 1968

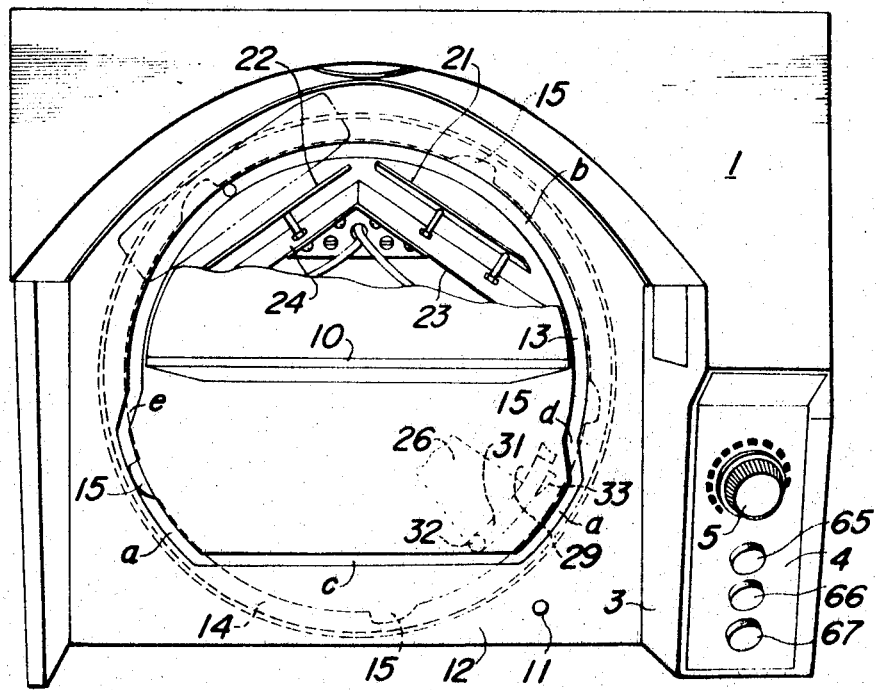

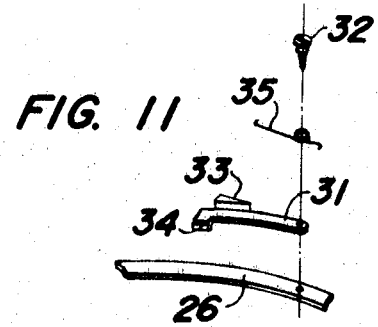
FIG. 11
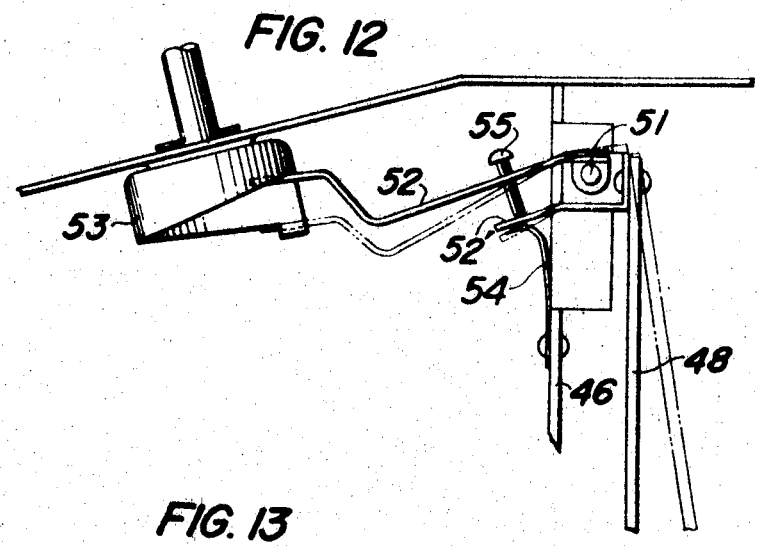
FIG. 12
FIG. 13
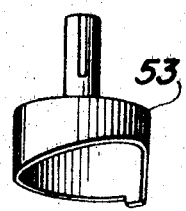
FIG. 14
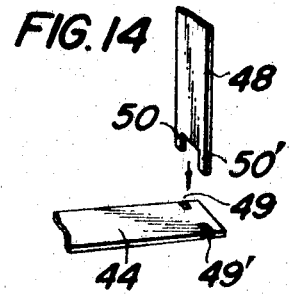

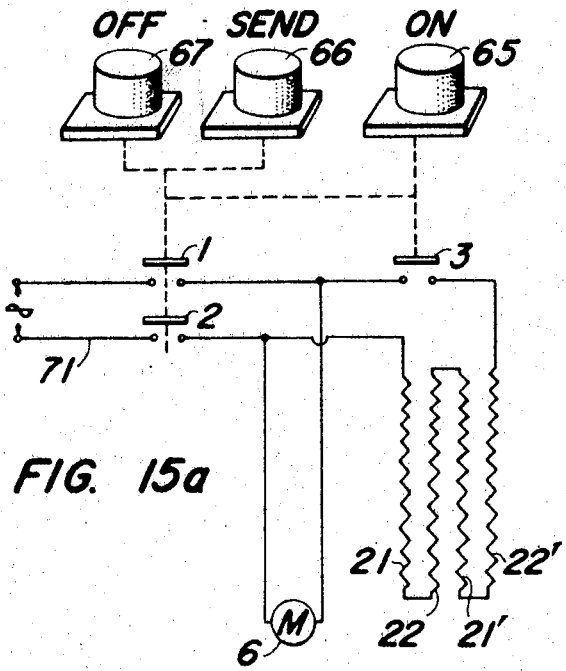
FIG. 15a
FIG. 15b
| | 1 | 2 | 3 |
|---|---|---|---|
| OFF | × | × | × |
| SEND | ○ | ○ | × |
| ON | ○ | ○ | ○ |
○ ---- CLOSE
× ---- OPEN
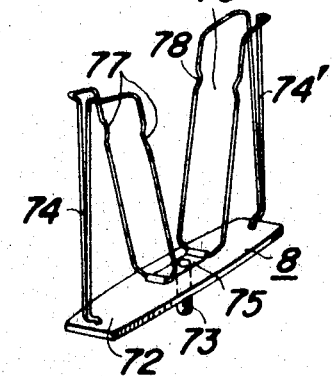
FIG. 16
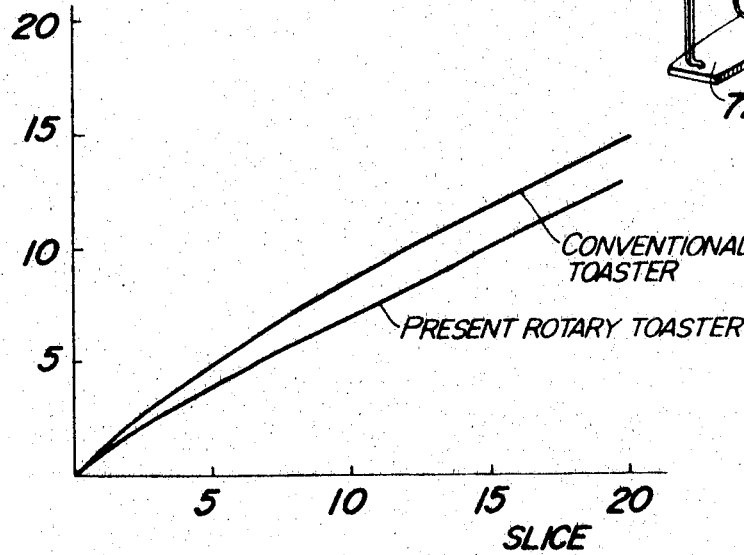
FIG. 17

United States Patent Office 3,515,054
Patented June 2, 1970

3,515,054
ROTARY TOASTER
Tadashige Sato, Toyonaka-shi, and Shinya Tsutsumi, Kobe-shi, Japan, assignors to Matsushita Electric Industrial Co., Ltd., Osaka, Japan, a corporation of Japan
Filed June 17, 1968, Ser. No. 737,535
Claims priority, application Japan, June 23, 1967, 42/40,675; Aug. 10, 1967, 42/68,925, 42/68,926, 42/68,927; May 17, 1968, 43/33,452
Int. Cl. A47j 37/08
U.S. Cl. 99—335                7 Claims

ABSTRACT OF THE DISCLOSURE

A toaster which is so designed that slices of bread are toasted to a desired extent while they make a full turn along a closed loop line and which therefore is compact in form and capable of toasting a number of slices of bread continuously and efficiently.

---

The present invention relates to a rotary toaster and more particularly to a toaster which is so designed that slices of bread are toasted continuously by circulating them along a circular path, so as to be adapted for use in a household having a large family or in business establishments, by the continuous toasting operation it is possible to eliminate waiting time and to serve the toast quickly with a minimum space requirement.

Heretofore, toasters of slim line type, two-slice type and four-slice type have been common but none of them are capable of toasting slices of bread continuously. On the other hand, a conventional toaster, capable of a continuous toasting operation, has the drawback of requiring a large space because it is so designed that slices of bread travel through the oven rectilinearly from one end of the oven towards the other and accordingly the bread loading station is separated from the toast discharging station.

The rotary toaster of the present invention basically comprises a circular track for guiding a multiplicity of bread carrier frames, said circular track being composed of a semicircular track with a smaller diameter and a semicircular track with a larger diameter, heater elements arranged along said semicircular track with the smaller diameter to constitute a bread toasting region, and carrier frame driving means for forcibly driving the carrier frames along said smaller diameter track at a predetermined interval.

An object of the present invention is to provide a rotary toaster which is provided with quick advancing means whereby pieces of bread are moved quickly so that the heat from heater elements in the toaster, to which the pieces of bread are subjected, can be adjusted and the pieces of bread are evenly toasted to a desired extent.

Another object of the present invention is to provide a rotary toaster wherein the rotating speed of a rotary wheel by which slices of bread are carried, is suitably regulated automatically in response to a temperature change interior of the toaster, whereby the bread toasting time is adjusted and the slices of bread are evenly toasted to a desired extent.

Still another object of the present invention is to provide a rotary toaster which is so designed that slices of bread are quickly moved into a spot between heating elements and held thereat stationary for a predetermined period by the action of intermittent driving means, whereby the slices of bread are toasted in an efficient manner.

Still another object of the present invention is to provide a rotary toaster which is so constructed that a plurality of slices of bread loaded in carrier frames side by side at the loading station are forcibly circulated one after another along a circular track for toasting and are returned to the loading station upon completion of the toasting.

Still another object of the present invention is to provide a rotary toaster which is so designed that the toasting operation is performed while slices of bread are circulated along a circular track, and the bread loading station is provided in the same plane as the toast discharging station, and which therefore can be used without occupying much space.

Still another object of the present invention is to provide a rotary toaster wherein a number of bread carrier frames are circulated along a circular track by means of hooks provided along the peripheral edge of a driving ring and said driving wheel has a number of equally spaced holes bored through the peripheral side wall thereof for engagement with a gear driven by a motor at reduced speed.

According to the present invention, a toasting efficiency equal to or higher than that of the conventional four-channel type toaster with substantially the same power consumption as that of the conventional one-channel type or two-channel type toaster can be obtained.

Still according to the present invention, there is provided a toaster which is compact in form so as to be useful for domestic use and capable of toasting a large number of pieces of bread continuously.

Still according to the present invention, it is possible, by employing an intermittent driving system, to toast slices of bread always evenly and this can be attained with a minimum space requirement.

Other objects, features and advantages of the present invention will be readily apparent from the following detailed description of certain preferred embodiments taken in conjunction with the accompanying drawings, in which:

FIGS. 4 and 5 are top views, with a portion broken away for the purpose of explaining the operation of the carrier frame operating means;

FIG. 11 is an exploded perspective view of a forwarding pawl unit provided on a quick forwarding plate of the operating means;

FIG. 12 is a cross-sectional view of a toasting time adjusting mechanism;

FIG. 13 is an elevational view of a cam used in the toasting time adjusting mechanism;

FIG. 14 is a perspective view showing the engagement between a bimetal and an idler operating lever in the toasting time adjusting mechanism;

FIG. 15a is an electric circuit diagram of the toaster;

FIG. 15b is a table showing the ON-OFF conditions of switches in said circuit diagram;

FIG. 16 is a perspective view of a bread carrier frame adapted to be operated by the carrier frame operating means; and FIG. 17 is a chart graphically showing in comparison the toasting efficiencies of a conventional toaster and the present toaster.

Figure 1:
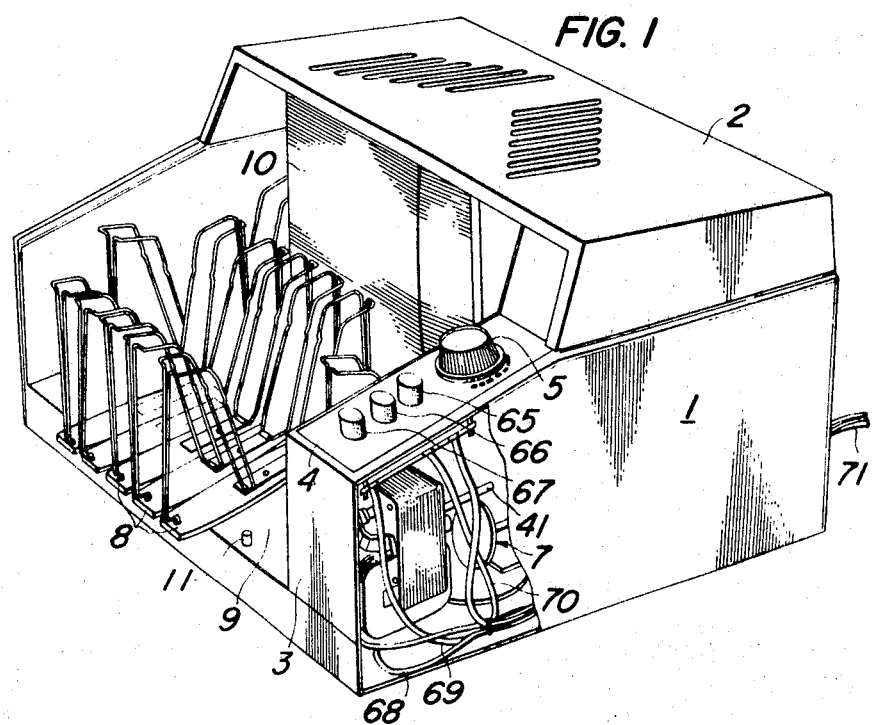
FIG. 1 is an overall perspective view, with a portion broken away, of an embodiment of the rotary toaster according to this invention.
Figure 6:
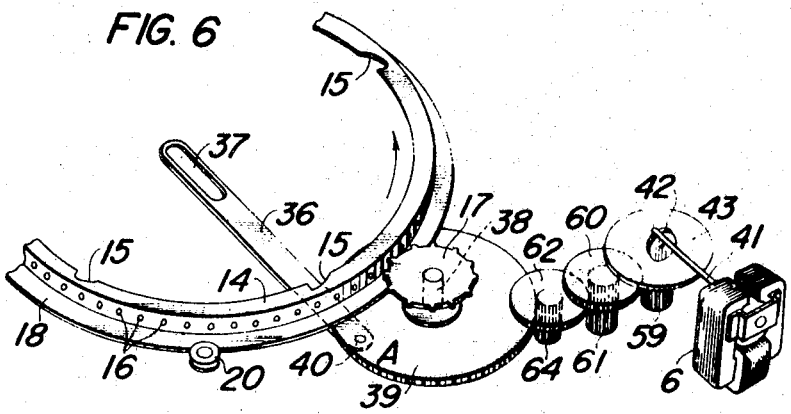
FIG. 6 is a schematic perspective view for explaining the engagement between a driving ring of the operating means and the reduction gearing.

The present invention will be described by way of an embodiment with reference to the accompanying drawings.

The toaster comprises a casing 1 open at the front and top ends. The rear portion of the top end of the casing 1 is covered with a top 2. Provided at one side of the casing 1 is a compartment in which a motor 6 and a reduction gearing 7 to be described later are housed. The top end of the compartment is provided with a switchboard 4 and a toasting degree adjusting knob 5.

Figure 2:
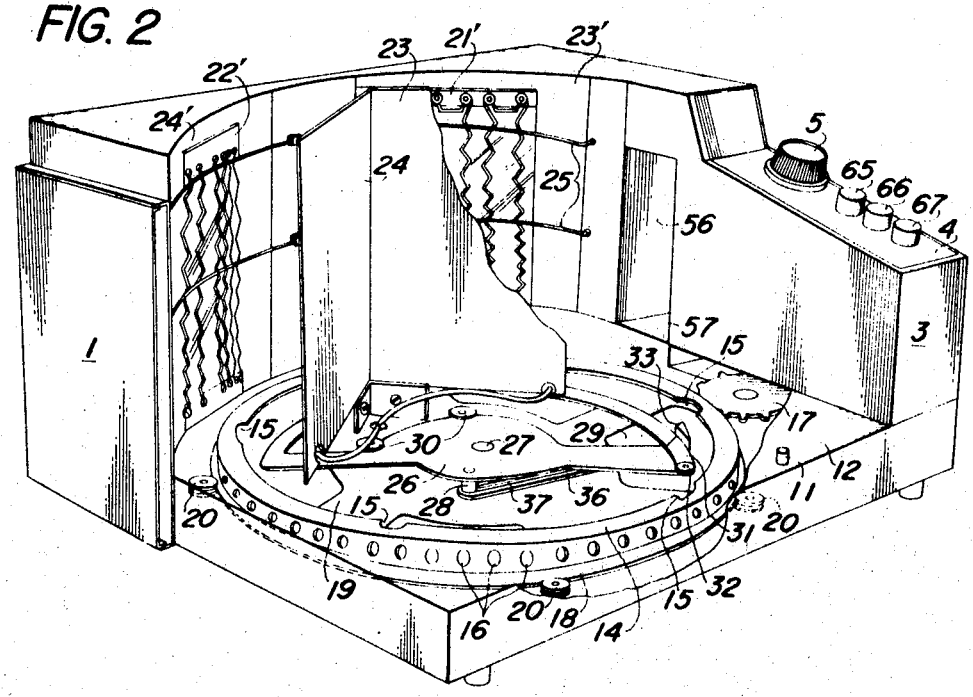
FIG. 2 is a perspective view, with a portion broken away, showing the mechanism of bread carrier frame operating means.
Figure 3:
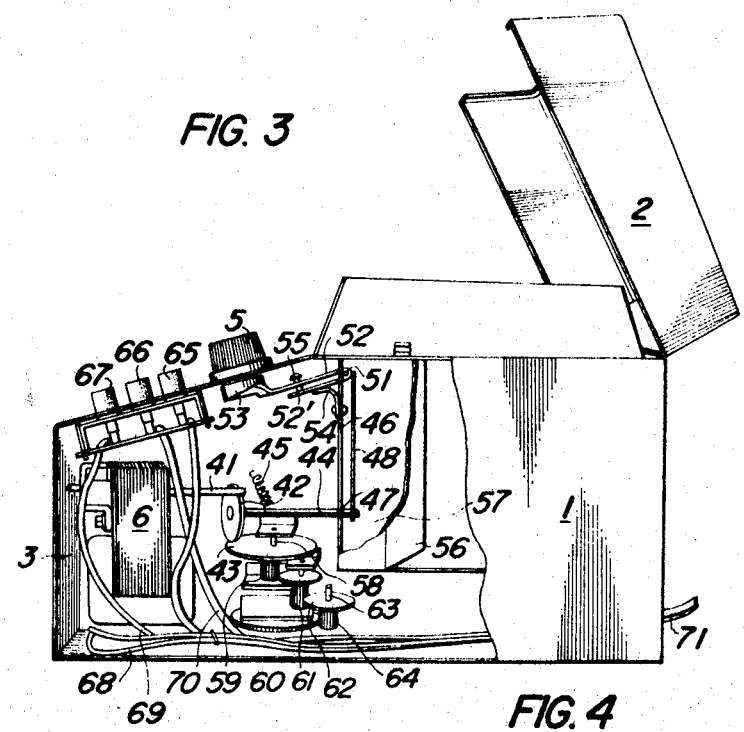
FIG. 3 is a side view, with a portion broken away, showing the mechanism of a driving source and a reduction gearing, etc.
Figure 4:
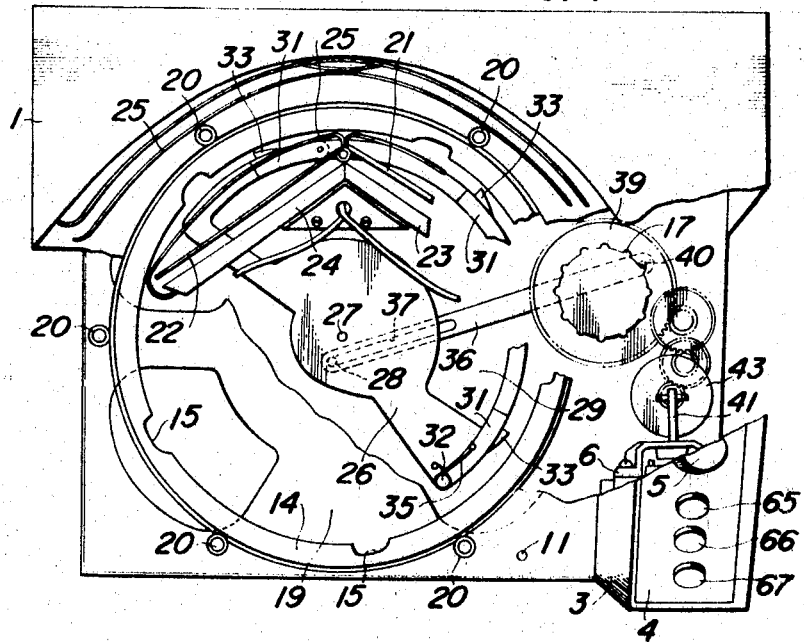
Figure 7:
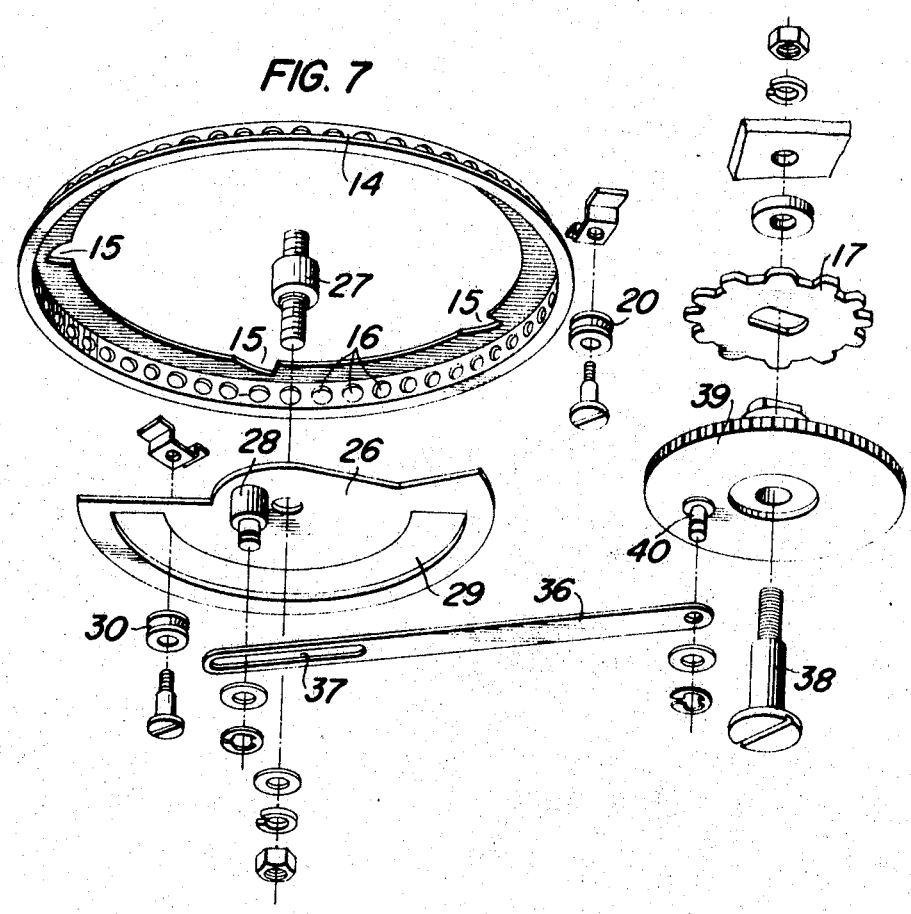
FIG. 7 is an exploded perspective view of the operating means.

Bread carrier frames 8 are arranged side by side at the front space of the casing 1, that is at a bread loading station 9, and this front space 8 is separated from the rear portion of the casing 1 by a decorative panel 10 so that heating elements in the rear portion may not be visible from the exterior, said decorative panel simultaneously serving to prevent the heat of the heating elements from escaping to the front portion of the casing. Reference numeral 11 designates a pin by which the position of the bread carrier frame 8 is regulated when said carrier frame is moved out of the loading station. As shown in FIG. 5, the bottom plate 12 of the casing 1 is formed with a closed loop of track 13 composed of a larger diameter portion $a$, a smaller diameter portion $b$ and a straight portion $c$, while a driving ring 14 is provided on the underside of the bottom plate 12 in such a manner that the inner peripheral edge thereof is in register with the outer peripheral edge of the smaller diameter portion $b$ of said track 13. The driving ring 14 is circular in shape and has a crank-shaped cross-section. A plurality of suitably spaced notches 15 are formed in the annular top wall of the driving ring 14, while a number of equally spaced holes 16 are bored through the side wall thereof for engagement with a gear 17 which is driven from the motor 6 through the reduction gearing. The rotating speed of the driving ring 14 and the number of teeth of the gear 17 are determined by the number of the aforesaid notches 15, and the cooperation between the driving ring and the gear will be described later. The flange portion 18 of the driving ring 14 is received in the grooves of a plurality of grooved rollers 20, as best shown in FIG. 4, and thereby the driving ring 14 is rotated smoothly, said rollers being rotatably mounted on a reinforcement plate 19 disposed on the underside of the casing 1. The number of the notches 15 is determined by the size of the driving ring 14 and the dimensions of bread carrier frames 8. In the embodiment shown, the driving ring is provided with five notches. The straight portion $c$ of the closed loop of track 13 extends across the bread loading station at the front portion of the casing 1. When the carrier frame 8 reaches the left end extremity of the straight portion $c$ of the driving track 13, the carrier frame 8 is disengaged from the driving ring 14 and simultaneously the extreme right one of the plurality of carrier frames 8, arranged in the bread loading station 9 in engagement with the straight portion $c$ of the track 13 as shown in FIG. 1, is forced out into the larger diameter portion $a$ of the track to be carried by the driving ring 14. Such circulatory movement of the carrier frames 8 will be described in further detail hereinafter. The smaller diameter portion $b$ of the track 13 is located within a tunnel defined by the casing 1, top 2 and decorative panel 10. Two pairs of heating elements 21, 21' and 22, 22' are arranged in the tunnel in such a manner that the heating elements of each pair are disposed in confronting relation to each other on both sides of the smaller diameter portion $b$ of the track and both pairs are arranged at an angle (which is about 72 degrees in the embodiment shown) to each other. As shown in FIG. 2, heat reflectors 23, 23', 24 and 24' are disposed behind the heating elements 21, 21', 22 and 22' respectively and the heat reflectors 23 and 24 are hidden by the decorative panel 10, so that the interior of the tunnel may not be visible from the front of the casing 1. In front of the respective heating elements 21, 21', 22 and 22' are provided transversely extending guards 25, consisting of wires, etc., which not only keep the slices of bread away from the heating elements but also serve as guides for the carrier frames 8 during quick movement of the carrier frames between the heating elements.

The quick forwarding plate 26 disposed below the bottom plate 12 of the casing has a substantially semicircular shape and is pivotally mounted at its center on a pivot 27, fixed on the reinforcement plate 19, so that it makes a reciprocal movement about said pivot 27 along the smaller diameter portion $b$ of the track 13. This quick forwarding plate 26 carries a pin 28 at a point offset from the center thereof and is also formed with a wide arcuate slot 29 therein. The inner edge of the arcuate slot 29 is in engagement with grooved rollers 30, 30, rotatably mounted on the reinforcement plate 19, so as to facilitate a smooth pivotal movement of the quick forwarding plate 26.

Pawl members 31 are provided along the outer edge of the quick forwarding plate 26. Each of the pawl members 31 has one end pivotally connected to the quick forwarding plate 26 by a pivot pin 32, and the other end thereof is flexed in the shape of a crank and provided with a pawl 33 projecting outwardly from the outer edge of the quick forwarding plate 26 for quickly forwarding the carrier frame 8 by engagement therewith and with a flexed end 34 to define the position of said pawl member 31, said flexed end being urged outwardly against the inner edge of the quick forwarding plate 26 under the bias of a spring 35.

A linkage 36 has an elongate slot 37 formed in one end thereof in which the aforesaid pin 28 on the quick forwarding plate 31 is slidably received. The other end of the link 36 is pivotally connected to a gear 39 by means of a pivot pin 40 at a point A offset from the center of said gear 39, said gear 39 being mounted on a shaft 38 coaxially with the gear 17 by which the driving ring 14 is driven. Thus, it will be appreciated that the elongate slot 37 in the link 36 makes one reciprocal movement with respect to the pin 28 during every revolution of the gear 39, whereby the quick forwarding plate 26 makes a reciprocal movement about the pivot 27 through an angle of 72 degrees.

Now, the mechanism 3 to drive the gears 17 and 39 will be explained.

Reference numeral 41 designates a motor shaft, 42 an idler and 43 a friction disc. The idler 42 is in contact with the friction disc 43 with the axis thereof at right angles to the radial direction of said friction disc and the motor shaft 41 is in contact with the idler 42, and thus the drive of the motor 6 is transmitted to the friction disc 43.

The idler 42 is supported by a lever 44 in such a manner that it can be displaced reciprocally radially of the friction disc 43. Further, the idler 42 is biased against the motor shaft 41 and the friction disc 43 under the action of a spring 45 so that the rotation of the motor shaft 41 may be positively transmitted to the friction disc 43 through the idler 42 without slippage between the respective members.

With such arrangement, it will be understood that by displacing the idler 42 with respect to the friction disc 43, the reduction ratio of the motor shaft 41 is changed and thereby the rotating speed of the gear 39 and accordingly the toasting time can be adjusted.

The lever 44 which has one end connected to the idler 42 and is reciprocally movable radially of the friction disc 43 as described above, has the other end projecting out through an aperture 47 in a supporting plate 46, provided in the compartment 3 of the casing 1, and connected at its end extremity with one end of a bimetal 48, the other end of which is pivotally secured at the upper portion of the supporting plate 46.

The manner in which the ends of the lever 44 and the bimetal 48 are engaged with each other is shown in FIG. 14. Namely, a rectangular notch is formed in the center of the lower end of the bimetal 48 to form projections 50, 50′ and these projections 50, 50′ are received in respective notches 49, 49′ formed in the opposite edges of the lever 44, whereby said lever 44 is moved laterally by said bimetal 48. The upper end of the bimetal 48 is secured to double levers 52, 52′ which are pivotally mounted on a pin 51 provided at the upper end of the supporting plate 46. The other end of the lever 52 is in contact with a cylindrical cam 53 which is rotatably mounted on the underside of the top wall of the compartment 3 above the friction disc 43.

The cam 53 consists of a cylinder having the end surface of the wall thereof cut slantingly in such a manner that the height of the cylindrical wall is progressively reduced in a clockwise direction, and is connected to the knob 5 on the top wall of the compartment 3 so as to be rotated thereby. Thus, it will be seen that when the knob 5 is revolved causing the cam 53 to rotate, the free end of the lever 52 is moved up and down and thereby the position of the bimetal 48, secured at one end to the other ends of the levers 52, 52′, can be changed.

More specifically, when the knob 5 is revolved clockwise, the free ends of the levers 52, 52′ are moved upwardly about the pin 51 under the bias of a spring 54, with the free end of the lever 52 sliding on the cam surface of the cam 53, and therefore the lower end of the bimetal 58 is moved to the left pushing the lever 44 to the left. Thus, the point of contact between the idler 42 and the friction disc 43 is displaced towards the periphery of said friction disc, that is, to a point further remote from the center of said friction disc. This means that the reduction ratio of the motor 6 becomes greater, so that the rotating speed of the gear 39 is reduced and the toasting time is prolonged, with the result that the toast is done darker brown.

On the other hand, when the knob 5 is revolved in a counter-clockwise direction, the double levers 52, 52′ are depressed by the cam 53, so that the lower end of the bimetal 48 is moved to the right. As a result, the reduction ratio of the motor 6 is reduced with the gear 39 rotating faster and the toasting time becoming shorter, so that a lighter brown toast can be obtained. The lever 52 is provided with an adjusting screw 55 which extends through said lever with the forward end in contact with the lever 52′. By adjusting the position of the lever 52′ upon rotation of the adjusting screw 55, it is possible to adjust the initial position of the lower end of bimetal 48. Namely, when the adjusting screw 55 is screw threaded through the lever 52, the lever 52′ is spaced further apart from the lever 52 by being depressed by the forward end of said screw, causing the lower end of the bimetal 48 to move to the right, and thus the starting position of the said bimetal can be adjusted.

The side wall of the casing 1 is cut-bent outwardly, i.e. inwardly of the compartment 3, as at 56 to form a window 57, through which the heat in the tunnel generated by the two pairs of heating elements is led into the bimetal portion in the compartment. The bimetal 48 detects the temperature in the tunnel by way of the heat introduced into the compartment 3 and automatically adjusts the reduction ratio of motor 6, whereby the toasting time can be adjusted.

The rotation of the motor 6 is reduced by the idler 42 and the friction disc 53 as stated above and transmitted to the gear 17 which drives the driving ring 14, and to the gear 39 which operates the quick forwarding plate 26 through the link 36 at a reduced speed. Namely, the rotation of the motor 6 is reduced by a pinion 59 mounted on a shaft 58 coaxially with the friction disc 43 and a gear 60 engaging said pinion 58′, further reduced by a pinion 61, coaxially with the gear 60, and a gear 62, and further reduced by a pinion 64, coaxially with the gear 62, to be transmitted to the gear 39.

Namely, the rotation of the motor 6 is transmitted to the friction disc 43 through the idler 42, and the rotation of the friction disc 43 is in turn transmitted to the gear 39 through the above-described two step reduction gearings to rotate said gear 39 at a desired speed, that is, the speed at which the gear 39 makes a full turn in a period of time which is one-half of the period of time required for toasting a piece of bread as will be described later.

The arrangement is such that the driving ring 14 revolves one-fifth of its full turn upon one complete turn of the gear 39, and the elongate slot 37 in the link 36, connecting the gear 39 with the quick forwarding plate 26, makes one reciprocal movement upon completion of one complete turn of the gear 39, causing said quick forwarding plate to make a reciprocal pivotal motion about the pivot 27 through an angle of 72 degrees.

Figure 8:
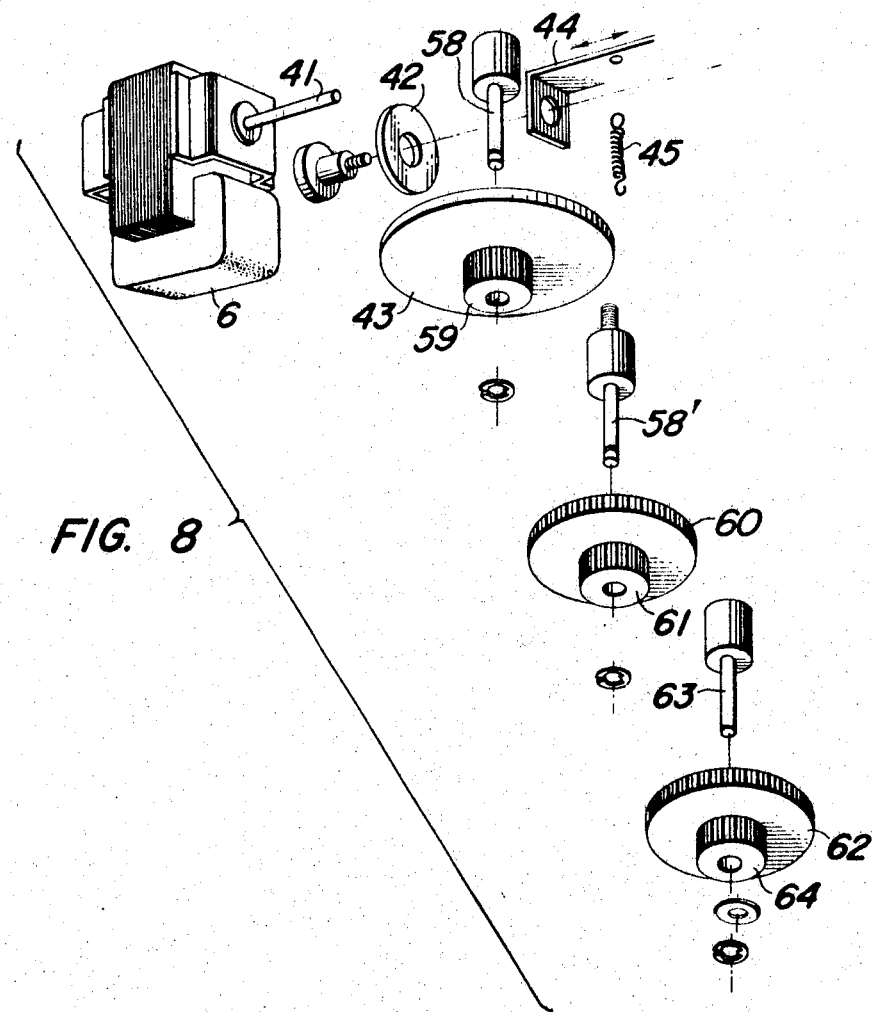
FIG. 8 is an exploded perspective view of a portion of the reduction gearing.

Next, when a switch 65 on the top surface of the compartment 3 is switched on, a current is conducted through the heating elements 21, 21′, 22, 22′ and the motor 6, whereby the toasting operation and simultaneously the carrier frame forwarding operation are commenced. However, when a switch 66 is put on, the current supply to the heating elements 21, 21′, 22, 22′ is interrupted, with the motor 6 only being energized continuing the carrier frame forwarding operation, and thus the toasting operation can be stopped as desired. When the entire circuit is desired to be de-energized, this can be achieved by actuating a switch 67 which is an "OFF" button. Reference numerals 68, 69 and 70 designate lead wires arranged on the switchboard 4 and 71 designates a power cord. The structure of the bread carrier frame 8, which is forwarded by the driving ring 14 and the quick forwarding plate 26 with a slice of bread therein, is shown in FIG. 8. As shown, each carrier frame 8 comprises a bread mounting base plate 72 and a pair of wire frames 74, 74′ erected on said base plate, said base plate being provided at the center of the under surface thereof with a pin 73 which is adapted to be engaged by the pawl 33 of the quick forwarding plate 26 for forwarding the carrier frame. The wire frames 74, 74′ consist of a resilient material and have one end fixed to the opposite end of the base plate 72 and the other end secured to the central portion of said base plate by means of a fitting strap 75 integrally with the aforesaid pin 73, thereby forming a bread receptacle 76 for holding a slice of bread vertically therein. The wire frames 74, 74′ form two pairs of projections 77, 78 projecting inwardly of the bread receptacle 76, by which the slice of bread is held in position reliably and marks of the wire frames 74, 74′ which would otherwise be left on the bread surface, are prevented.

Now, the toasting operation will be described hereunder.

In the embodiment shown, the toaster has nine carrier frames 8 to be circulated along the track 13. Of these nine carrier frames 8, five of them are always located at the straight portion c of the track 13, two of them at the respective larger diameter portions a and two of them at the smaller diameter portion b at positions confronting the heating elements 21, 21' and 22, 22' respectively. The carrier frames 8 are moved one by one through the space between the heating elements by the action of the driving ring 14 and the quick forwarding plate 26. Suppose that the gears 39 and 17 are rotating at a predetermined speed in a clockwise direction (in the direction of the arrow). When the pin 40 on the gear 39 is located at a point A in FIGS. 9 and 10, the pin 28 on the quick forwarding plate 26 is located at the left end extremity of the elongate slot 37 in the link 36. As the pin 40 moves from the point A to a point B, the link 36 is moved in engagement with the pin 40 causing the quick forwarding plate 26 to make a counterclockwise rotation about the pin 28. Namely, the quick forwarding plate 26 rotates counterclockwise about the pivot pin 27. As the pin 40 further moves from the point B to a point C, the quick forwarding plate 26 remains motionless, with the pin 28 only sliding in the slot 37 of the link 36. When the pin 40 has reached the point C, the pin 28 is located at the right end extremity of the slot 37 in the link 36. As the pin 40 further moves from the point C to a point D, the slot 37 continuously urges the pin 28 at its right side end causing the same to rotate in a clockwise direction. Namely, the quick forwarding plate 26 is rotated clockwise about the pivot pin 27. During further movement of the pin 40 from the point D to the point A, the pin 28 only slides in the slot 37 in the link 36, as in the case of movement of the pin 40 from the point B to the point C, and therefore the quick forwarding plate 26 remains motionless. Namely, the link 36 makes one reciprocal movement and the quick forwarding plate 26 makes one semicircular reciprocal movement during one complete turn of the pin 40 on the gear 39.

Figure 9:
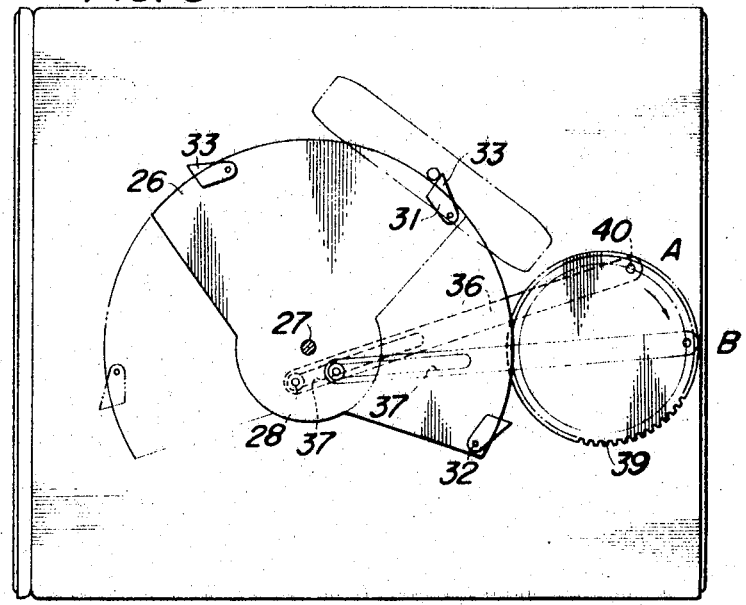
FIGS. 9 and 10 are illustrative views for explaining the operation of the operating means.
Figure 10:
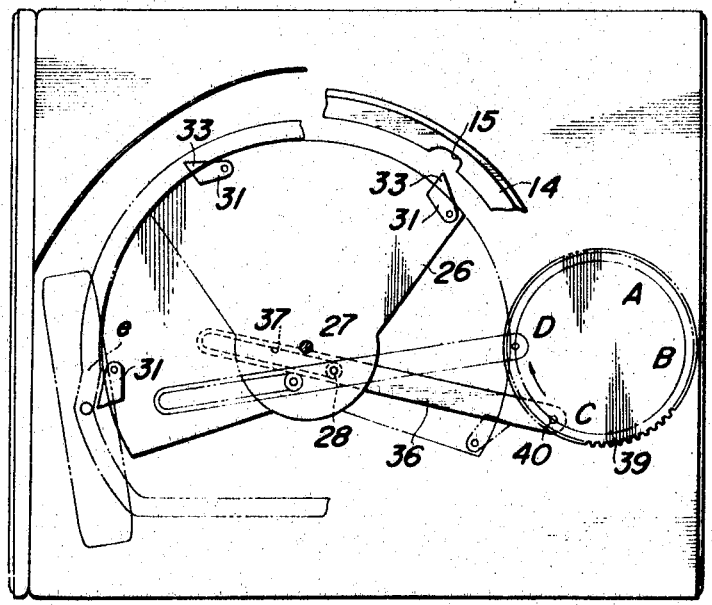

In toasting slices of bread using the rotary toaster provided with the quick forwarding means according to the present invention, by loading the slices of bread on the respective bread carrier frame 8, the carrier frames 8 are rotationally moved in a counterclockwise direction as the pin 40 moves fom the point A to the point B. Upon reaching a point d shown in FIG. 5, the pin 73 of the carrier frame 8, received in the notch 15 in the driving ring 14, is disengaged therefrom at the transitional portion from the larger diameter portion a to the smaller diameter portion b of the track 13 and forced into said smaller diameter portion b of the track. Then, the pin 73 of the carrier frame 8 is moved along the smaller diameter portion b counterclockwise by being pushed by the pawl 33 of the pawl member 31 on the quick forwarding plate 26 which is also rotating counterclockwise, and carried in between the pair of heating elements 21, 21'. Further, as shown in FIGS. 9 and 10, the pin 40 on the gear 39 rotationally moves successively from the point B to the point C, from the point C to the point D and from the point D again to the point A. Since the quick forwarding plate 26 remains stationary during the periods when the pin 40 moves from the point B to C and from the point D to the point A, as mentioned previously, the slice of bread in the carrier frame is successively toasted during said periods by the heat from the heating elements 21, 21' and 22, 22'. As the pin 40 begins to move again from the point A towards the point B, the carrier frame 8 is again moved by the pawl 33 of the pawl member 31 on the quick forwarding plate 26 counterclockwise and reaches a point e, where the pin 73 of the carrier frame is again received in the notch 15 in the slowly rotating driving ring 14 and the carrier frame 8 is moved rotationally slowly by said driving ring.

The operation described above is repeated entirely automatically and thereby slices of bread are toasted evenly to a desired extent. As stated above, the quick forwarding plate 26 rotates clockwise during the movement of pin 40 from the point C to the point D in FIG. 10, but the carrier frame 8 is retained in its position without being returned clockwise by the pawl member 31 of the quick forwarding plate 26 along with said plate, because the pawl 33 which is biased outwardly by the action of the spring 35 retracts on abutment against the pin 73 of the carrier frame. The toasting period can be adjusted by rotating the knob 5 to change the contact point between the idler 42 and the friction disc 43 and thereby to change the rotating speed of the gear 39.

With the rotary toaster of this invention, it is possible to toast two or three slices of bread more than the number of slices of bread which can be toasted with a conventional toaster, with the same power consumption and during the same period of time, as is understood from the chart of FIG. 17 in which the toasting efficiency of the present toaster is compared with that of the conventional one. Namely, by the use of the present toaster, toasts can be served for a greater number of people during a short period of time.

What is claimed is:

1. A rotary bread toaster comprising spaced apart opposed heater elements, a closed-loop guiding means and bread carrier frames movable therealong, said closed loop means comprising a first extent along which the carrier frames are exposed for loading and unloading of bread slices therein, and a second extent along which the carrier frames are caused to pass between the opposed heater elements in parallel relation thereto, a drive mechanism for driving said frames along said second extent and being arranged to release said frames upon their coming onto one end of said first extent, the frames coming off said second extent and onto said first extent abutting against each other whereby they drive each other along said first extent and successively off an opposite end of said first extent and onto said second extent.

2. The rotary toaster of claim 1, wherein said driving mechanism includes an intermittent drive means for driving said frames along said second extent in an intermittent manner whereby the frames pause at intervals during their travel along said second extent so as to expose a bread slice to a predetermined dwell time between the heater elements.

3. The rotary toaster of claim 2, including a motor and a reduction gearing between said motor and said driving mechanism, an idler and a friction disc, a reduction gear coaxial with said disc, a bimetal temperature sensitive member, a lever having said idler rotatably mounted at one end thereof and connected at its opposite end to the free end of said bimetal member, said bimetal member being arranged to deform in response to temperature conditions within the toaster whereby said idler is displaced radially of said friction disc thereby changing the reduction ratio between said motor and said driving mechanism and correspondingly the length of time that said frames travel along said second extent.

4. The rotary toaster of claim 3, including a manual control means for displacing said lever so as to manually vary the reduction ratio between said motor and said driving mechanism.

5. The rotary toaster of claim 1, said second extent of said closed-loop means being circularly arcuate and said closed-loop means comprising intermediate extents between said first and second extents, said intermediate extents being circularly arcuate and of layer diameter than said second extent, said drive mechanism including a circular driving ring coaxial with and having an inner diameter substantially equal to that of said intermediate extents, said frames each including a central pin engaged in said closed-loop guiding means, a plurality of circumferentially spaced apart notches along the inner circular edge of said ring and adapted to each engage a said pin along the said intermediate extents of said closed-loop means, said first and second extents of said closed-loop means being located radially inwardly of said ring inner circular edge whereby said pins are disengaged from said ring notches while said pins are along said first or second extents of said closed-loop means.

6. The rotary toaster of claim 5, said drive mechanism comprising an intermittent drive means for driving said frames along said second extent in an intermittent manner whereby the frames pause at intervals during their travel along said second extent, said intermittent drive means being adapted to engage said frames only along said second extent of said closed-loop means.

7. The rotary toaster of claim 6, said drive mechanism comprising a quick action member rotatively mounted co-axially with said ring, first and second coaxially rigidly interconnected gear members driven by a motor means, said first gear member being drivingly connected with said ring so as to rotatively drive same continuously, said second gear member being drivingly connected with said quick action member so as to oscillate same in opposite rotative directions with intermittent pauses.

References Cited

UNITED STATES PATENTS

| | | | |
|---|---|---|---|
| 1,555,336 | 9/1925 | Vaughan | 99—386 XR |
| 1,963,924 | 6/1934 | Smith | 99—334 |
| 2,447,641 | 8/1948 | Dunham | 99—334 XR |
| 2,714,348 | 8/1955 | Fokakis | 99—387 |
| 3,277,813 | 10/1966 | Luscher | 99—391 |

BILLY J. WILHITE, Primary Examiner

U.S. Cl. X.R.

99—386, 391, 443